Nov. 16, 1971    J. E. BRELSFORD ET AL    3,619,992

STEERING WHEEL MOUNTING ON A SELF-PROPELLED COMBINE

Filed July 1, 1970    2 Sheets-Sheet 1

INVENTORS
JOHN E. BRELSFORD
EDMUND O. HOWELL
BY ATTORNEY

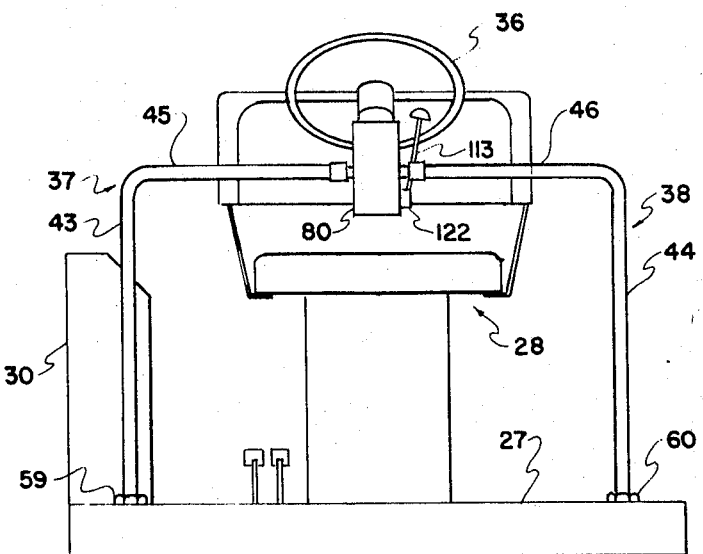
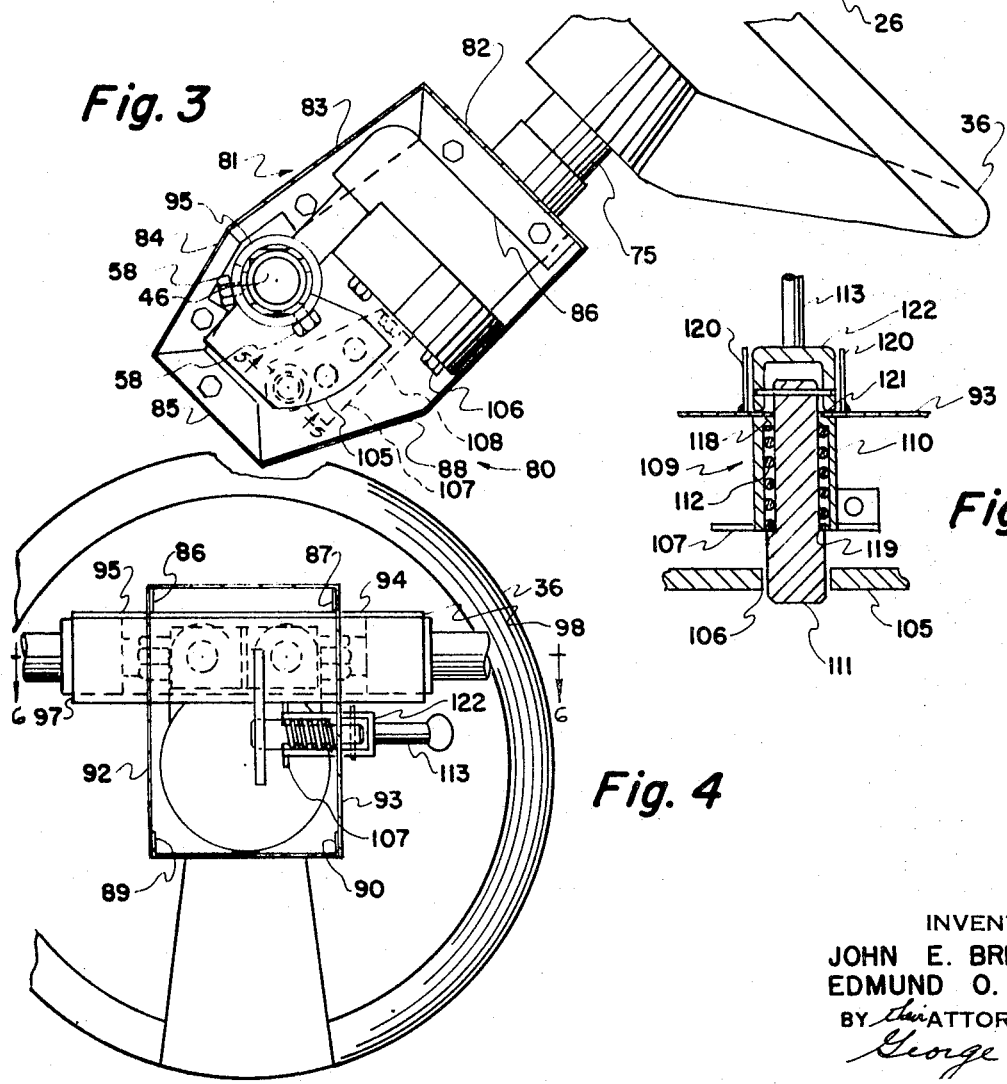

United States Patent Office 3,619,992
Patented Nov. 16, 1971

3,619,992
STEERING WHEEL MOUNTING ON A SELF-PROPELLED COMBINE
John E. Brelsford, Terre Hill, and Edmund O. Howell, New Holland, Pa., assignors to Sperry Rand Corporation, New Holland, Pa.
Filed July 1, 1970, Ser. No. 51,431
Int. Cl. A01d 41/02
U.S. Cl. 56—10.1
12 Claims

ABSTRACT OF THE DISCLOSURE

A U-shaped support on the operator's platform of a self-propelled combine has a hydraulic steering and control valve and an enclosing casing pivotedly mounted thereon. A steering wheel actuates the valve. The U-shape of the support provides a clear viewing of the forward part of the header.

BACKGROUND OF THE INVENTION

This invention relates to the supporting of a steering wheel on the operator's platform of a self-propelled combine.

On self-propelled combines the steering wheel and controls are on an operator's platform on the front of the combines. Some of the combines have the platform on the left and some have centered platforms over the crop elevator. The steering wheel is usually mounted on a steering post in the middle of the front of the platform. These posts provide an obstruction to the area of vision of the combine when viewing downwardly on the front of the header. This obstruction is particularly pronounced with centered platforms. The centered platforms are raised to clear the crop elevator and project forwardly so that the line of vision to the header is sharply downward.

In operating a combine the header height should be maintained substantially constant or within a given cutting range. The height is hydraulically or mechanically controlled from the operator's console on the platform. Variations in ground contour require readjustment in the height of the header.

The entire width of the forward part of the header should be easily viewed by the seated operator, including the cutter, reel, and the area in back of the cutter. In this area the feed of crops can be observed and any choking of the header may be compensated for by slowing the combine's forward speed.

The speed of the combine can be adjusted to the capacity of the header to properly handle and feed the crops to the crop elevator. It is also preferable to be able to view the width of the cutter bar from the operator's seated position and to avoid hitting obstructions such as rock and mounds.

It is preferable that the operator be seated. In the seated position the control levers are readily accessible and promptly adjusted to vary the operation of the combine or height of the header. In the standing position the control levers are not as readily accessible or easily operated as in the seated position.

The purpose of this invention is to provide a simple and inexpensive support for the steering wheel that provides a substantially unobstructed viewing of the width of the forward part of the header by a seated operator, particularly in front of the operator.

OBJECTS AND SUMMARY OF THE INVENTION

An object of this invention is to provide a support for the steering wheel on the operator's platform that provides a clear viewing of the forward part of the header supported by the combine.

Another object of this invention is to provide a supporting framework for the steering wheel that permits a full viewing of the forward part of the header and also functions as a guide rail on the front of the operator's platform.

Another object of this invention is to utilize the tubular members as a support for the steering wheel and to convey hydraulic fluid to and from a hydraulic valve operated by the steering wheel and also provide a wide field of vision of the front part of the header by a seated operator.

In summary this invention is a U-shaped support comprising two L-shaped members affixed to adjacent front corners of an operator's platform and connected at adjacent ends to a hydraulic valve feeding fluid to the valve for controlling the direction of a combine by a steering wheel actuating the valve while the L-shaped members are spaced to provide a full downward view of the forward part of the header by a seated operator.

These and other objects and advantages of this invention will be apparent from the following description and claims taken in connection for the accompanying drawings which illustrate the various features of this invention.

BRIEF DESCRIPTION OF THE DRAWING

FIG. 2 is a front view of the operator's platform with the seat control console steering wheel and steering wheel support.

FIG. 3 is an enlarged side view of the hydraulic valve casing, and actuating steering wheel with side piece removed.

FIG. 4 is a top view of the steering wheel and hydraulic valve.

FIG. 5 is a sectional view taken along lines 5—5 of FIG. 3 of the holding pin and bracket fixing the wheel in one of three positions.

DETAILED DESCRIPTION OF THE EMBODIMENT OF THE INVENTION

Figure 1:
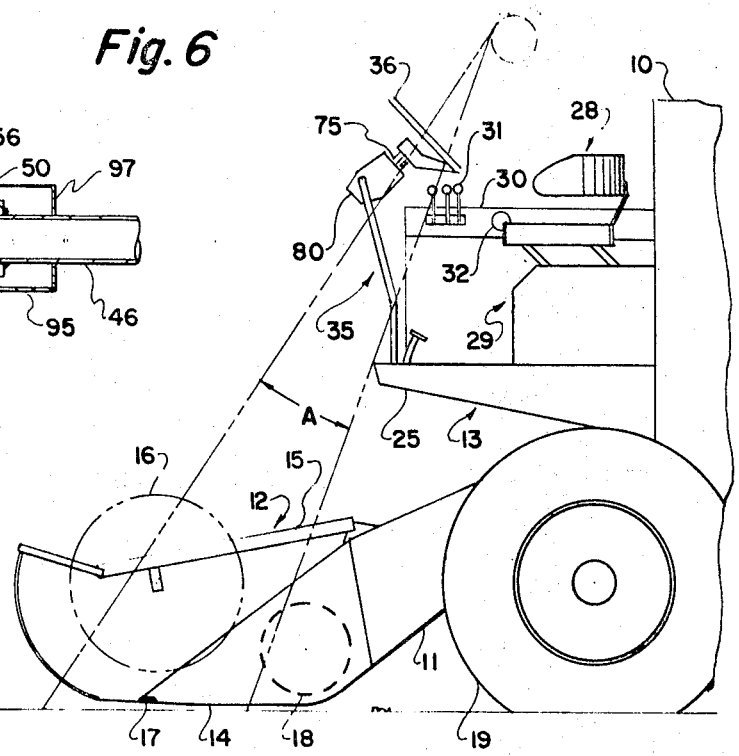
FIG. 1 is a fragmentary side view of a combine illustrating the operator's platform, crop elevator and header.

Introduction: Referring to FIG. 1, a fragment of the front end of the main frame or housing 10 of the combine enclosing the threshing, separating and cleaning means is shown. A crop elevator 11 is mounted on the front of the main frame 10 for conveying crop material to the threshing and separating means, not shown, from the header 12 mounted on the front of the crop elevator 11. The operator's platform 13 also extends forwardly from the front of the main frame 13 directly above the crop elevator 11. The header 12 may be of a conventional type and have a main frame 14 with an adjustable supporting means 15 at both ends for rotatable supporting reel 16 over a range of vertical and horizontal positions above a sickle 17 or cutter bar mounted on the frame. A consolidating auger 18 is rotatably mounted on the frame 14 for conveying the cut crops from the ends of the header 12 to the narrow crop elevator 11 which has a width substantially the same as the width of the main frame of the combine. On the sides of the front end are the large wheels 19 supporting and driving the combine.

On the operator's platform is the adjustable seat 28 for the combine operator, the console 30 for the various meters 32 and control levers 31 and a U-shaped framework 35 at the front. A casing 40 containing a hydraulic valve is tiltably mounted on the framework and has the steering wheel 36. The steering wheel actuates the rear steering wheels (not shown) through a hydraulic system including the valve.

The framework 35 carries the hydraulic fluid to and from the hydraulic valve. The casing enclosing the valve has means for holding the wheel at a plurality of positions.

OPERATOR'S PLATFORM

The operator's platform sits on two parallel beams 25 extending forwardly from the main combine frame and securely attached thereto for rigidly supporting the platform 13. A channel member 26 extends across the front of the platform between the two beams 25 and a generally square sheet metal deck 27 is welded to the top edges of the beams and transverse channel member. A conventional seat 28 is adjustably supported on the link type pedestal 29 secured to the deck. The seat may be set over a range of positions in relation to the steering wheel 36. A control console 30 is mounted on the right side of the seat and has the various control levers 31 and instruments 32 utilized in the operation of the combine.

STEERING WHEEL SUPPORT FRAMEWORK

A steering wheel support framework 35 is on the front part of the operator's platform and is transverse to the direction of travel of the combine. This framework is formed (FIGS. 2 and 6) by two L-shaped members 37, 38, a strap 39, and the casing 40, of the hydraulic valve. The L-shaped members 37, 38 each have vertical legs 43, 44 and horizontal arms 45, 46. The legs 43, 44 securely fastened to the generally square deck plate 27 near the left and right front corners at opposite sides of the platform. The arms are perpendicular to the legs and extend towards one another and are fastened together to form the framwork 35. Adjacent ends are rotatably fastened to the casing 40 of the hydraulic valve by fittings 47, 48, respectfully. In this embodiment, the legs, as illustrated in FIG. 1, are intermediately bent forwardly to position the transverse arms 45, 46 above the forward edge of the platform.

The adjacent ends of the arms of the L-shaped support members 37, 38 have connectors 49, 50 mounted respectfully thereon for attachment to the fittings 47, 48. The connectors have bores for receiving the ends of the respective arms. The connectors have nipples at the opposite ends from the arms for receiving the respective nuts 55, 56 of the respective fittings. The connectors are welded to the arms respectively and the bores extending through the nipples to pass fluid between the respective arms 45, 46 and the fittings 47, 48.

Figure 6:
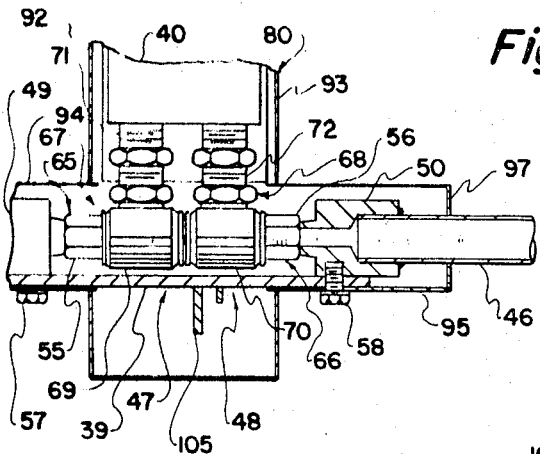
FIG. 6 is a sectional view taken along line 6—6 of FIG. 4 of the connection between the arms and a side view of the fittings.

In the preferred embodiment as shown in detail in FIG. 6 the connectors 55, 56 are interconnected by the semicylindrical rigid strap 39. The strap is bolted to a respective connector by pairs of bolts 57, 58 to rigidly and firmly fasten the ends of the arms of the L-shaped member together. The L-shaped members 37, 38 are securely mounted on the deck of the operator's platform by fittings 59, 60. Thus the firm U-shaped framework 35 spans the front of the operator's platform.

VALVE AND VALVE FITTINGS

The fittings 47, 48 are L-shaped and have fixed single piece members 65, 66 and rotatable members 67, 68. The single piece members are formed by nuts 55, 56 and tubular members (not shown) extending axially to the respective arms 45, 46. The rotatable members have collars 69, 70 and threaded portions 71, 72.

The tubular members (not shown) fit within the collars 69, 70 and have parts (not shown). The ends of the tubular members and collars are rotatably sealed to interchange fluid with the threaded fittings on the casing of the valve. The valve collars rotate about the axis of said tubular members and arms for rotation of the valve in a vertical plane perpendicular to the arms of the L-shaped support.

The casing 40 with the valve and steering wheel 36 are positioned in front of the operator's seat 28 for easy holding and turning of the wheel from a seated position. The valve may be of the conventional type with the fittings connected to the intake and discharge and with a shaft 75 extending from the top of the valve. The hand steering wheel 36 is mounted on the control shaft for turning of the shaft by an operator. Rotation of the shaft varies the amount of hydraulic fluid passed through the valve and supplied to the hydraulic system actuating the steering mechanism.

CASING AND CUP-SHAPED MEMBERS

A casing 80 is made of stamped sheet metal pieces (FIG. 3). The main piece 81 forms the top, center, front, and bottom panels 82, 83, 84, 85, and has flanges 86, 87 along the side edges. A back piece 88 has flanges 89, 90, for attachment to the top and bottom panels 82, 85 of the main piece 81. The side pieces 92, 93 forming the side panels are mounted on the flanges of the main and back pieces. The casing encloses the valve and pivotal fittings and is attached to the valve by the top panel 82 being fastened to the top of the valve.

Cup-shaped tubular members 94, 95 extend from respective side pieces 92, 93 and have cylindrical sides fitting over the end of the respective connectors thereon. The tubular members extend to within the casing and in rotatable relation therewith. The cup-shaped members have annular disc members 96, 97 fastened to the cylindrical portion to cooperate with the casing in enclosing the valve and fittings 47, 48. The cup-shaped members are not fastened to the casing but to the connectors 49, 50 in fixed relation to the arms.

STEERING WHEEL POSITION HOLDER

Since the fittings 47, 48 permit rotation of the valve and casing 40 about the transversally extending arms 45, 46 it is desirable to provide a firm locking of the casing and wheel in position. The strap 39 affixed to the connectors 49, 50 has a holding plate 105 (FIG. 6) extending perpendicular to the strap 39 and positioned upwardly and rearwardly of the strap. Three holes 106 are provided in the plate to receive a retracted locking pin 111 and hold the casing valve and wheel in a selected position. A bracket 107 is attached to the bottom of the valve by a casing valve bolt 108 threaded into the valve casing and extends parallel to the holding plate. The pin supporting and actuating means 109 is fixed to the bracket and the side piece of the casing for firm mounting of the pin means in relation to the casing and valve.

The pin means comprises a tubular member 110, locking pin, helical spring 112 and actuating lever 113. The tubular member 110, is affixed to the bracket 107 and has an inner flange 118 adjacent the side piece. The locking pin 111 is slidably mounted in the tubular member 110 and has a shoulder 119 facing the inner flange. The helical spring 112 is positioned between the shoulder 119 and the flange 118 for urging the pin towards the holding plate 105 and into registry with the holes 106.

On the outer side of the side plate 93 are two parallel guides 120 perpendicular to the plate 93 and spaced on opposite sides of the opening 121 through which the pin 111 projects. A cast or die cast rectangular block 122 with a recess fits between the guides. An actuating lever or handle 113 is thread into a boss in the block and extends at an angle from the side panel. On tilting the handle away from the side panel the pin 11 is withdrawn from the plate to unlock the casing. The casing and wheel can be tilted by rotation on the fittings. The pin is reengaged with the plate by registering with the same hole or one of the other holes 106 depending on the position desired.

The L-shaped supports 37, 38 operationally hold the steering control, transmission of hydraulic fluid and form a guard rail. The space between the vertical legs 43, 44 portions is unobstructed and the arms 45, 46 supporting the casing are above the lines A (FIG. 1) of downward vision. The operator observes the width of the header at the cutting means, reel and the area to the rear of the cutting means for observing the feeding of the material to the auger.

Figure 7:
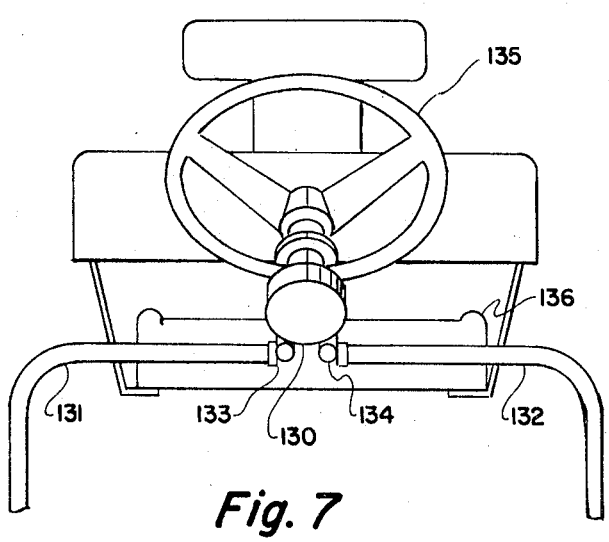
FIG. 7 is a front view of another embodiment of the mounting of a hydraulic valve on a supporting framework.
Figure 8:
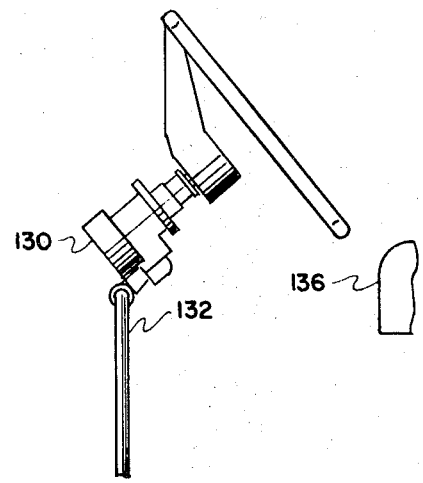
FIG. 8 is a side view of the embodiment in FIG. 7.

In FIGS. 7 and 8 another form of the invention is disclosed. In this embodiment the valve 130 is mounted on the ends of the arms 131, 132 of the supports by the rotatable fittings 133, 134 as shown in FIG. 7. The valve 130 is positioned above the arms instead of below the arms as in the preferred embodiment. A steering wheel 135 is attached to the valve 130 and may be turned by an operator in the seat 136. The rotatable fittings 133, 134 sufficiently tight to hold the valve and wheel in any selected position. As in the other embodiment support means may be provided to hold the valve in various positions.

It is thus seen from the foregoing description that the front framework on the operator's platform of the combine supports the steering wheel control and also provides a clear view of the entire width of the forward portion of the header on the combine. The operator in seated position has all of the combine controls in easy reach and the instruments indicating the speed and operation of the combine in view. In this seated position the operator on looking downward can observe the forward portion of the header. This portion of the header includes the cutting means, reel and in front of the auger to observe the feeding of cut crops to the consolidating auger extending across the width of the header. The seated operator also can view the contour of the ground immediately forward of the cutting means to change the height of the cutting means above the ground as the contour varies. It is very desirable to maintain the cutting height in relation to the ground within a given range. Also the header can be lifted to clear rocks, mounds and debris in the field.

In combines having the platform on the left side, the operator still has an improved downward view of the header and better observe the cutting and flow of crops.

Another feature of the front structure is the pivotal mounting of the hydraulic valve on the two L-shaped members permitting the wheel to be set at a number of different positions depending upon the desires of the combine operator. The L-shaped members in addition to functioning as a support also function as conduits to carry the hydraulic fluid to and from the control valve and also act as a guard rail. Thus the single front framework has been simplified to adjustably support the steering wheel, to provide hydraulic fluid to act as guardrail and still provide a clear vision of the forward portion of the header from a seated position on the operator's platform.

While this invention has been described in connection with two embodiments thereof it will be understood that it is capable of modification, and this application is intended to cover any variations, uses, or adaptations following, or in general, the principles of the invention and include such departures from the present disclosure as come with known or customary practice in the art of which the invention pertains, and as forward in the scope of the invention or the limits of the attended claims.

Having thus described our invention, what we claim is:

1. A front framework on a combine operator's platform comprising a hydraulic valve with two fittings, two support means securely attached to the platform at opposite sides thereof, respectively, and extending towards one another to have adjacent ends attached to respective fittings of said hydraulic valve for firmly interconnecting said support means with said hydraulic valve and while providing a clear view between and under said support means for viewing the width of a header from a seated position.

2. A front framework as set forth in claim 1 wherein said fittings rotatably support said hydraulic valve.

3. A front framework set forth in claim 1 wherein a casing is provided mounted on said valve.

4. The front framework as set forth in claim 2 wherein means are provided between said ends of said supports and said valve for setting said valve at a number of different positions.

5. A front framework as set forth in claim 1 wherein said supports comprise two L-shaped members having, respectively, portions securely attached to said platform on opposite sides thereof and arm portions extending generally horizontal from the upper end of said leg portions and towards one another with said ends immediately adjacent said valve, and said fittings connected to said ends.

6. A front framework as set forth in claim 5 wherein a strap extends between said adjacent ends and it is securely fastened thereto to rigidly interconnect said arm portions.

7. On a self-propelled agricultural equipment having an operator's platform and header on the front of the equipment with a header projecting forwardly of the platform, a seat on said platform for positioning an operator with a line of vision including the front part of said header, a hydraulic valve with a steering wheel for actuating the steering mechanism on the equipment and means on the platform for supporting the hydraulic valve with a wheel in a driving position characterized by: said support means comprising two L-shaped tubular members having upwardly extending legs mounted on opposite sides of the operator's seated position on said platform and forwardly thereof and two generally transverse arms extending from said legs towards one another and with adjacent ends transversally spaced, said hydraulic valve connected to said ends to form a U-shaped framework above and to the side of the line of vision for supporting said wheel said valve with and conducting fluid through said support means for interchanging fluid with said valve to steer said equipment on turning of said wheel.

8. On the front of a self-propelled crop harvester having a crop elevator an operator's platform above said crop elevator and with a seat, a header mounted on the crop elevator and projecting forwardly more than the platform with the cutting means and reel of the header in the downward line of vision of an operator seat on the platform, an hydraulic valve with a wheel for actuating a steering mechanism on the harvester and means on the platform for supporting said hydraulic valve with said wheel in a driving position characterized by said supporting means comprising two supporting tubular members having vertical legs forwardly mounted on opposite sides of the operator's seated position on said platform and two horizontal portions extending towards one another and with the adjacent ends transversally spaced, said hydraulic valve connected to said ends for forming a U-shaped framework above, and to the side of the downward line of vision, and said supporting tubular members conducting fluid passing through said valve to steer the harvester on turning of said wheel.

9. On a self-propelled crop harvester as set forth in claim 8 wherein said vertical legs are positioned at the respective sides of said platform.

10. On a self-propelled crop harvester as set forth in claim 8 wherein said hydraulic valve is pivotedly connected to said horizontal portions to permit tilting of said valve and supported steering wheel.

11. On a self-propelled crop harvester as set forth in claim 8 wherein said downward line of vision is unobstructed between said vertical legs.

12. On a self-propelled crop harvester as set forth in claim 2 wherein said front of said platform is rearward of the line of vision and said U-shaped framework provide unobstructed viewing across the width of the platform.

References Cited
UNITED STATES PATENTS

| | | | |
|---|---|---|---|
| 2,949,971 | 8/1960 | Cline | 180—6.3 |
| 3,205,968 | 9/1965 | Rose | 180—79.2 |

LOUIS G. MANCENE, Primary Examiner

J. N. ESKOVITZ, Assistant Examiner

U.S. Cl. X.R.

180—79.2; 280—87